United States Patent
Rajamanickam et al.

(10) Patent No.: US 9,535,780 B2
(45) Date of Patent: Jan. 3, 2017

(54) VARYING LOGGING DEPTH BASED ON USER DEFINED POLICIES

(71) Applicant: International Business Machines Corporation, Armonk, NY (US)

(72) Inventors: Logeswaran T. Rajamanickam, Tirupur (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/082,804

(22) Filed: Nov. 18, 2013

(65) Prior Publication Data

US 2015/0143182 A1    May 21, 2015

(51) Int. Cl.
G06F 11/00    (2006.01)
G06F 11/07    (2006.01)
G06F 11/30    (2006.01)

(52) U.S. Cl.
CPC ....... G06F 11/0781 (2013.01); G06F 11/0706 (2013.01); G06F 11/0787 (2013.01); G06F 11/30 (2013.01); G06F 11/3072 (2013.01); G06F 11/3075 (2013.01)

(58) Field of Classification Search
CPC .............. G06F 11/0781; G06F 11/0787; G06F 11/3072; G06F 11/3075; G06F 11/0766
See application file for complete search history.

(56) References Cited

U.S. PATENT DOCUMENTS

| | | | |
|---|---|---|---|
| 5,857,190 A * | 1/1999 | Brown | |
| 6,802,067 B1 | 10/2004 | Camp et al. | |
| 7,120,685 B2 * | 10/2006 | Ullmann et al. | 709/224 |
| 7,263,632 B2 * | 8/2007 | Ritz et al. | 714/25 |
| 7,475,401 B1 * | 1/2009 | Frey et al. | 719/313 |
| 7,493,598 B1 | 2/2009 | Craggs | |
| 7,526,550 B2 | 4/2009 | Frey et al. | |
| 7,559,055 B2 * | 7/2009 | Yang et al. | 717/127 |

(Continued)

FOREIGN PATENT DOCUMENTS

WO    0047003 A1    8/2000

OTHER PUBLICATIONS

Circular buffer, Captured Dec. 3, 2007 and retrieved via the Internet Archive, Wikipedia, p. 1.*

(Continued)

Primary Examiner — Marc Duncan
(74) Attorney, Agent, or Firm — Olivia R. Scheuer (57) ABSTRACT

Techniques for writing logging files, where the logging files include multiple pieces of logging information. The pieces of logging information are based on operation of a computer system. The writing of the logging information includes the following steps (not necessarily in the following order): (i) choosing a set of logging rules; which logging rules determine the selection of which pieces of operational information relating to the computer system will be written to a non-volatile log file; (ii) operating the computer system; (iii) during operation of the computer system, collecting a first set of pieces of operational information; (iv) saving the first set of pieces of operational information to a volatile buffer memory; and (v) writing only a first sub-set of the first set of pieces of operational information to a first log file.

18 Claims, 4 Drawing Sheets

(56) References Cited

U.S. PATENT DOCUMENTS

| | | | | |
|---|---|---|---|---|
| 7,644,320 | B2* | 1/2010 | Kawashima | 714/46 |
| 7,725,770 | B2 | 5/2010 | Owen et al. | |
| 8,001,094 | B2* | 8/2011 | Machida et al. | 707/694 |
| 8,250,402 | B2* | 8/2012 | Clark et al. | 714/6.21 |
| 8,255,182 | B2* | 8/2012 | Sarig et al. | 702/108 |
| 8,935,288 | B2* | 1/2015 | Vedula | 707/785 |
| 9,009,537 | B2* | 4/2015 | Addison | G06F 11/0715 714/38.1 |
| 9,256,574 | B2* | 2/2016 | Kuesel | G06F 15/76 |
| 2003/0028753 | A1* | 2/2003 | Ohishi | 712/205 |
| 2005/0028171 | A1* | 2/2005 | Kougiouris et al. | 719/318 |
| 2005/0060372 | A1* | 3/2005 | DeBettencourt et al. | 709/206 |
| 2006/0195731 | A1* | 8/2006 | Patterson et al. | 714/723 |
| 2008/0010497 | A1* | 1/2008 | Kronlund | G06F 11/0769 714/6.11 |
| 2008/0168242 | A1* | 7/2008 | Eberbach et al. | 711/161 |
| 2008/0168308 | A1* | 7/2008 | Eberbach | G06F 11/008 714/26 |
| 2008/0215932 | A1* | 9/2008 | Prescott et al. | 714/57 |
| 2008/0228849 | A1 | 9/2008 | Watkins | |
| 2009/0150560 | A1* | 6/2009 | Bestgen et al. | 709/231 |
| 2010/0095101 | A1 | 4/2010 | Derdak et al. | |
| 2011/0320586 | A1* | 12/2011 | Maltz et al. | 709/224 |
| 2012/0254337 | A1* | 10/2012 | Fake et al. | 709/207 |
| 2013/0227352 | A1* | 8/2013 | Kumarasamy | G06F 11/3072 714/47.1 |
| 2014/0109111 | A1* | 4/2014 | Gupta | G06F 11/0766 719/318 |
| 2014/0195564 | A1* | 7/2014 | Talagala et al. | 707/802 |
| 2014/0379892 | A1* | 12/2014 | Klimov et al. | 709/224 |
| 2015/0019512 | A1* | 1/2015 | Basak et al. | 707/692 |
| 2015/0058681 | A1* | 2/2015 | Lingannapeta et al. | 714/47.3 |
| 2016/0098325 | A1* | 4/2016 | Madou | G06F 11/3476 714/49 |

OTHER PUBLICATIONS

Kelapure, "First Failure Data Capture for your enterprise application with WebSphere Application Server", Jul. 8, 2011, <http://www.slideshare.net/kelapure/first-failure-data-capture-for-your-enterprise-application-with-websphere-application-server>.

Yuan et al., "Characterizing Logging Practices in Open-Source Software", pp. 102-112, Copyright 2012 IEEE, 34th International Conference on Software Engineering (ICSE), 2012, Zurich, Switzerland.

"All Things WebSphere: First Failure Data Capture for your enterprise application with WebSphere Application Server", Friday, Jul. 8, 2011, <http://wasdynacache.blogspot.in/2011/07/first-failure-data-capture-for-your.html>.

"First failure data capture (FDDC)", WebSphere Adapter Toolkit, Version 7.0, (C) Copyright IBM Corporation 2005, 2009, <http://pic.dhe.ibm.com/infocenter/dmndhelp/v7r0mx/topic/com.ibm.wsadapters.jca.wat.doc/doc/implementing/cffdc.html>.

"Targeted First Failure Data Capture and Reduction", ip.com, an IP.com Prior Art Database Technical Disclosure, Authors et al.: Disclosed Anonymously, IP.com No. IPCOM000214409D, IP.com Electronic Publication: Jan. 26, 2012, pp. 1-2.

\* cited by examiner

VARYING LOGGING DEPTH BASED ON USER DEFINED POLICIES

FIELD OF THE INVENTION

The present invention relates generally to the field of computer data logging, and more particularly to the selection of which data is logged.

BACKGROUND OF THE INVENTION

Computer data logging is the process of recording events, with a computer program (usually application software) within a certain scope in order to provide an "audit trail" that can be used to understand the activity of the system and/or to diagnose problems. Logs are useful to understand the activities of complex computer systems, particularly in the case of applications with little user interaction (such as server applications). Conventionally, the granularity of the information that gets logged is controlled by setting different log levels. A list of logging levels conventionally used is as follows: (i) DEBUG; (ii) INFO; (iii) WARN; (iv) ERROR; and (v) FATAL. DEBUG is the lowest logging level, which writes every possible piece of information, and is not recommended for a production environment. INFO is a restricted logging level, which writes information messages, and is also not recommended for a production environment. WARN is a more restricted logging level, which writes only warning and error messages, and is recommended for a production environment. ERROR is a more restricted logging level, which writes only error and exception messages, and is recommended for a production environment with a high volume of activity. FATAL is a level that logs only the "high" and/or "severe" messages, and is recommended for a production environment where all the actions are tracked closely.

SUMMARY

According to an aspect of the present invention, a computer program product, a system and/or a method writes a logging file. The logging file includes multiple pieces of logging information. The pieces of logging information are each based on operation of a computer system. The method includes the following steps (not necessarily in the following order): (i) choosing a set of logging rules, which logging rules determine the selection of which pieces of operational information relating to the computer system will be written to a non-volatile log file; (ii) operating the computer system; (iii) during operation of the computer system, collecting a first set of pieces of operational information; (iv) saving the first set of pieces of operational information to a volatile buffer memory; and (v) writing only a first sub-set of the first set of pieces of operational information to a first log file. The selection of the first sub-set from the first set is based upon the chosen set of logging rules.

DETAILED DESCRIPTION

This Detailed Description section is divided into the following sub-sections: (i) Explanations and/or Embodiments; (ii) Relatively Simple Embodiment; (iii) Environment For The Relatively Simple Embodiment; and (iv) Definitions.

I. Explanations and/or Embodiments

Some embodiments of the present disclosure recognize the following: (i) the first failure data capture (FFDC) preserves the information that is generated from a processing failure and returns control to the affected services; (ii) the captured data is saved in a log file for analyzing the problem; (iii) FFDC is intended primarily for use by Product/Application Service; (iv) FFDC instantly collects events and errors that occur during the runtime; (v) the information is captured as it occurs and is written to a log file that can be analyzed by a Product/Application Service representative; (vi) the logs that are collected have information based on the log levels set; (vii) the applications and/or products create logging messages based on the log level set in the environment; (viii) though the infrastructure for collecting all the information is present inside the application and/or products, the log levels need to be set explicitly to avail all possible information; (ix) in most of the production systems the log level is set to WARN or above for better performance, meaning that when some problem occurs in this production environment, all the possible information is not logged in the log files; (x) when a support engineer starts investigating this problem, he/she does not have complete information to isolate and fix the issue; and (xi) not having complete information will introduce delay in resolving the problem. Some embodiments of the present invention draw upon these various problem recognitions and/or solve these problems.

Some embodiments of the present invention further recognize as follows: (i) in a product and/or application support organization, problem determination based on the use of log messages is a potentially important activity; (ii) a typical support organization staff spends quite a lot of time to collect required log files with detailed logging level enabled for each PMR (Problem Management Report); (iii) having all the required and/or possible logging information in a single collection and/or location can potentially reduce PMR lifecycle; and/or (iv) it is advantageous to have relatively quick turn around time to identify and resolve problems using log messages from the log files.

Some embodiments of the present disclosure include one, or more, of the following features, characteristics and/or advantages: (i) write all possible log messages in a buffer in memory before writing the messages to a log file; (ii) based on the policy defined for the logging levels, evaluate the log messages and write the matching log contents into the log file; (iii) the policy for logging levels contains which logging level to be used based on some specific pattern identified from the log content and how much additional log data has to be chosen for writing into log file; (iv) the policy can be defined in such a way that, on a failure or exception situation it stores all the logging information (for example, all levels: DEBUG, INFO, WARN, ERROR and FATAL) messages for some predetermined interval of time (for example, ten (10) seconds) before and after the failure/exception condition is detected; and/or (v) the log buffer is a circular buffer so that when the log buffer gets full, older messages are discarded as new messages are added.

System flow for an embodiment of the present disclosure will now be discussed. When an application is built, the logging policy also gets defined and stored in the logging policy store. This logging policy store gets shipped, along with the application, as part of the "product." In operation, the application, by default, creates the log based on the log level set in the logging policy. In addition to that, all the entries, from the most comprehensive (or "lowest") logging level, get written into a circular buffer. A logging policy evaluation engine evaluates the policies against the current record from a compressed version of the circular buffer content. Based on the defined policy, log content from the buffer is filtered and selectively written into the log file. In this embodiment, the logging policy has the option to invoke FFDC.

Figure 1:
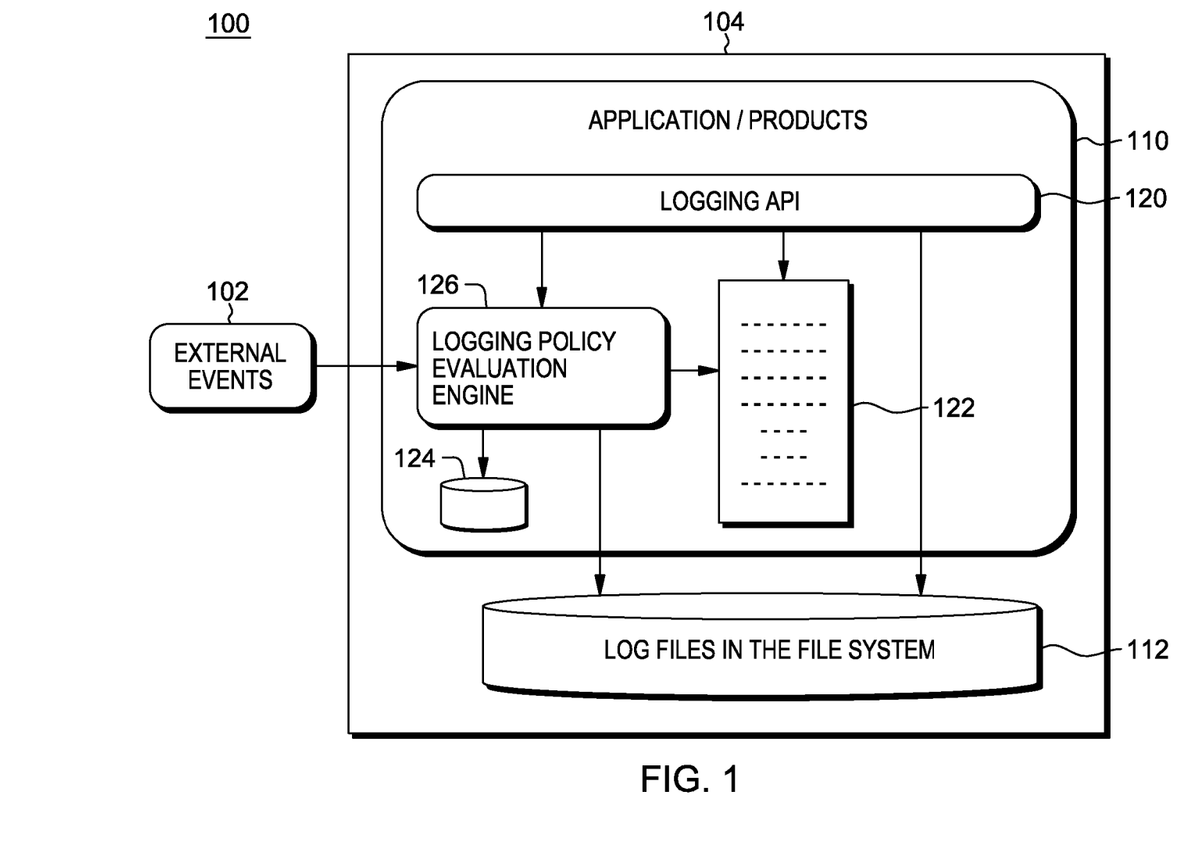
FIG. 1 is a schematic view of a first embodiment of a computer system according to the present disclosure.

As shown in FIG. 1, system 100 includes: external events block 102; and logging module 104. Logging module 104 includes: application/products block 110; and file system log files data store 112. Application/products block 110 includes: logging api (application interface) 120; circular buffer for logging messages 122; logging policy store 124; and logging policy evaluation engine 126. The logging policies, stored in policy store 124 have the following form:

```
<Policy_Name>
{
    Rule = <Regular Expression to detect log paterrn>
    LogLevel = <Debug,Info,Warn,Error,Fatal>
    RecordsBefore = <Number of seconds>
    RecordsAfter = <Number of seconds>
    SameThread=<Yes/No>
    InvokeFFDC=<Yes/No>
}
```

Some specific examples of policy codes, according to the foregoing form, will be discussed below.

An embodiment of an algorithm for a policy evaluation engine according to the present disclosure is: (i) read all the policy information from the policy store and cache it; (ii) read the current record from the log buffer; (iii) perform the policy evaluation on the current log record; (iv) if any policy matches then perform the log content filtering based on the policy; (v) store the filtered log content in a separate log file; (vi) add an additional entry in the product log about the additional information; (vii) the log buffer is the compressed circular buffer, so that when the buffer gets filled up, on arrival of a new record the oldest record stored in the buffer will be deleted; and (viii) the policy evaluation engine triggers the policies based on "external events."

Figure 2:
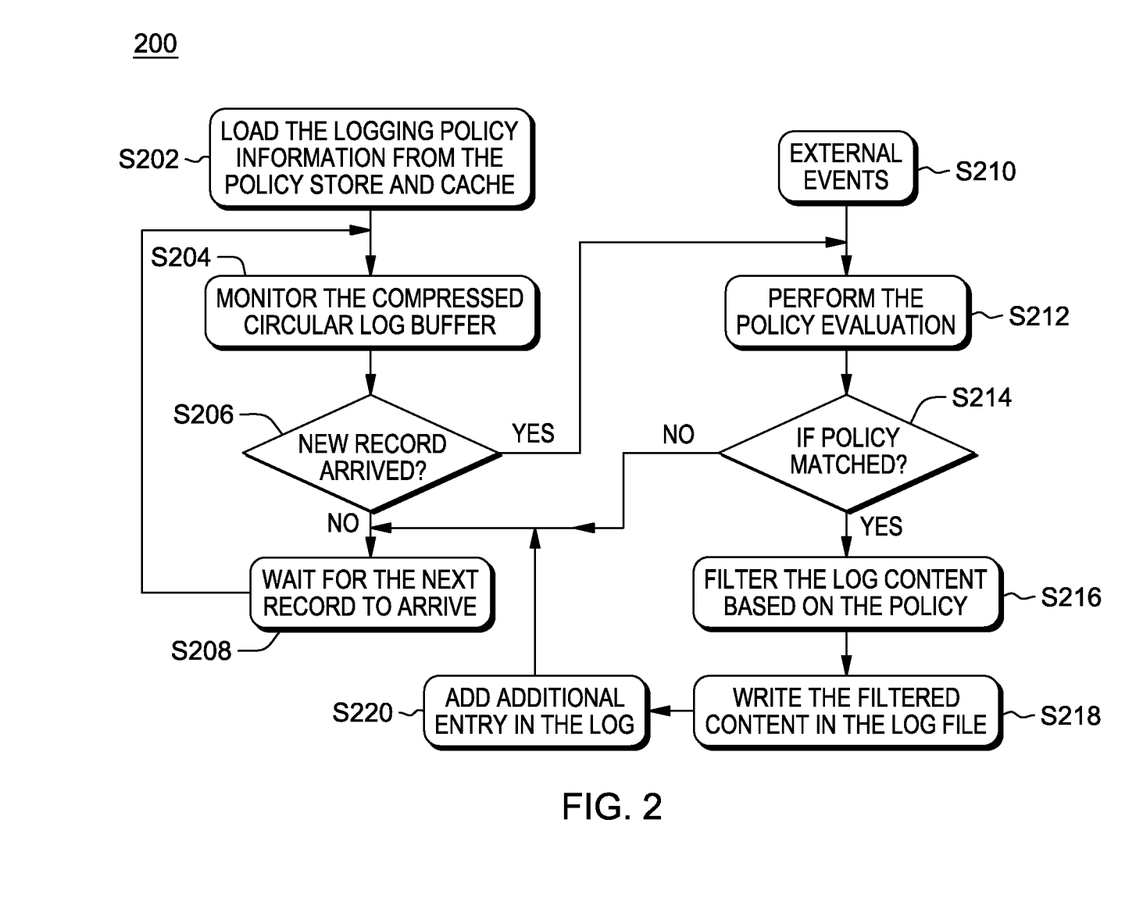
FIG. 2 is a flowchart showing a first method according to an embodiment of the present disclosure.

As shown in FIG. 2, an embodiment of the policy evaluation engine performs method 200, including the following steps: S202, S204, S206, S208, S210, S212, S214, S216, S218 and S220. Process flow among and between these steps is as shown in FIG. 2.

An example of a log collection policy, called <Policy_ConnectException>, is as follows:

```
Policy ConnectException
{
    Rule = "java\.net\.ConnectException:\s*" LogLevel = Info
    RecordsBefore = 10s RecordsAfter = 5s SameThread=Yes
    InvokeFFDC=Yes
}
```

"<Policy_ConnectException>" is the name of the policy set forth in the previous paragraph, and is a unique field value that serves to identify the policy. The rule here detects that the current log record contains "java.net.ConnectException." If the log record matches this rule, then the LogLevel value and TimeWindow value are used to filter the content. If the current log record contains java.net.ConnetException, then the log records are filtered from the log buffer for the same thread with the log level "info" for 10 seconds before and 5 seconds after. This rule invokes FFDC so that the details about connection parameters and other attributes are stored in FFDC logs.

Another example of a log collection policy, called <Policy_NullPointerException>, is as follows:

```
Policy_NullPointerException
{
    Rule = "java\.lang\.NullPointerException:\s*" LogLevel = Debug
    RecordsBefore = 20s RecordsAfter = 0s SameThread=Yes
    InvokeFFDC=No
}
```

The policy set forth in the previous paragraph is called "<Policy_NullPointerException>," which name is a unique field value that serves to identify the policy. The rule here detects that the current log record contains "java.lang.NullPointerException." If the log record matches this rule, then the LogLevel value and TimeWindow value are used to filter the content. If the current log record contains java.lang.NullPointerException, then the log records are filtered from the log buffer for the same thread with the log level "Debug" for 20 seconds before the nullpointerexception. Having log records with Debug level for the last 20 seconds for the same thread helps in determining the point at which data stops being passed and when the data is "turned to null."

Another example of a log collection policy, called <Policy_ADMA_MessageID>, is as follows:

```
Policy_ADMA_MessageID
{
    Rule = "ADMA\[0-9]+E*"
    LogLevel = Info RecordsBefore = 15s RecordsAfter = 10s
    SameThread=No InvokeFFDC=No
}
```

"<Policy_ADMA_MessageID>" is the name of the policy in the previous paragraph, which is, as in the above examples, used for identification purposes. The rule here detects that the current log record contains message id starting with "ADMA" and any digits and ends with "E." If the log record matches this rule then the LogLevel value and TimeWindow value is used to filter the content. If the current log record contains "ADMA0001E," then from the Log buffer the log records are filtered with the log level "info" for 15 seconds before and 10 seconds after.

Another example of a log collection policy, called <Policy_FFDC>, is as follows:

```
Policy_FFDC
{
    Rule = "FFDC\sIncident\semitted\s*" LogLevel = Debug RecordsBefore =
    20s RecordsAfter = 0s SameThread=Yes InvokeFFDC=No
}
```

The policy "<Policy_FFDC>" of the previous paragraph embodies a rule that detects that the current log record contains "FFDC Incident emitted." If the log record matches this rule, then the LogLevel value and TimeWindow value are used to filter the content. If the current log record contains FFDC Incident emitted then from the Log buffer the log records are filtered for same thread with the log level "Debug" for 20 seconds before the FFDC Incident. Having log records with Debug level for last 20 seconds for the same thread helps in analyzing the situation for the FFDC.

Some embodiments of the present invention may have one, or more, of the following features, characteristics and/or advantages: (i) in case of failure, the log will contain all the information for identifying/isolating the problem and helps in resolving the problem; (ii) having all the required/possible logging information at one location will reduce PMR lifecycle; (iii) reduction of turn around time to identify and resolve problems using log messages; (iv) grouping of log records based on one or more attributes (for example, thread, component, etc.) helps in organizing log data, which in turn speeds up analysis and problem resolution; (v) assist in providing necessary information pertaining to a failure without having to re-create a problem; (vi) assist in providing necessary information pertaining to a failure without having had to run the computer system at a granular logging level; (vii) the compressed buffer allows to store more data; and/or (viii) changes in logging depth based on the incident or events occurred in the environment collects all the related information for problem analysis.

Some embodiments of the present disclosure may have one, or more, of the following features, advantages and/or characteristics: (i) method and system for varying logging depth based on user defined policies; (ii) collecting log data at various depths is achieved by temporarily storing log events; (iii) previous logging messages are saved in a compressed circular buffer; (iv) logging level can be changed dynamically depending on user provided rules that are matched by the system; (v) previous logging messages that have not been logged can be saved based on applicable rule(s); (vi) previous logging messages may be grouped by one or more specific attributes; (vii) the system can invoke FFDC to increase the level of information logged based on user policies; (viii) the system can enable additional logging capabilities and dumping historical information based on the invocation of FFDC; (ix) the system uses a policy infrastructure to store and evaluate user policies that govern logging depth and problem data collection for an application; (x) a user policy may be triggered by the occurrence of one or more external incidents or events; and/or (xi) using buffer concepts and further collection, such as FFDC. Item (iv) in the foregoing list discusses the usage of rules/policies to enable a number of capabilities including saving of messages, grouping of messages and invoking further collection such as FFDC.

Some embodiments of the present invention may include one, or more, of the following features, characteristics and/or advantages: (i) writing a list of log messages at the most comprehensive feasible level in a buffer in memory before selectively writing some of the messages to a log file; (ii) basing the selective writing of log messages on the policy defined for the logging levels; (iii) evaluating the buffered log messages and choosing the rules and/or policies for selectively writing log messages to log files based upon the evaluation; (iv) one selective logging policy is that, on a failure or exception situation all the logging information (for example, DEBUG, INFO, WARN, ERROR and FATAL) messages are stored for a time interval, ten (10) seconds before and after the occurrence of the failure/exception; (v) having the complete logging information before and after the problem occurrence, effectively helps in diagnosing; (vi) the granularity of logging on a specific problem or situation can be defined by users as well; (vii) the policy mechanism helps in triggering additional activities/events on a failure situation that provides details for problem resolution; (viii) the granularity of the logging level is maintained for a specific amount of time (defined in the policy) after that the default logging level is applied (from the current time or the time of match of the policy, if the policy says 5 minutes, then from the time the policy evaluates to a match it is a duration of 5 minutes); (ix) logging everything into a buffer and then selectively committing to primary/persistent log storage based on policies; and/or (x) providing the ability to selectively log events based on other events that occur subsequent to the events being considered for possible logging (often an event that would not seem to be of interest when it occurs will become interesting because there is later an operational issue that needs to be understood).

System designers practicing embodiments of the present disclosure should make sure that buffering log messages is not unduly problematic in view of system resources (for example, that the cost of adding logs to buffer is not prohibitively high). A more subtle example of a design issue that should be dealt with is that memory may be affordable, but may cause problematic CPU overhead. One technique for dealing with this potential CPU overhead problem is to apply the logging buffer according to the present invention selectively when no issue of overhead caused by excessive logging into a fast/cheap buffer is likely to be occasioned in operation.

Some embodiments of the present invention may include one, or more, of the following features, characteristics and/or advantages: (i) works with a policy based infrastructure; (ii) allows users to define policies and provide grouping constructs and details on what should be saved in the log; (iii) allows for additional information to be collected from the environment dynamically (that is, in a manner defined by the policy and based on a policy tailored to specific operation circumstances); and/or (iv) dynamic defined policy leads to different and better log file content making the whole process of problem data collection more comprehensive Some embodiments of the present disclosure: (i) work through, or can be triggered by, external events to the system; and/or (ii) define flexible time windows for forcing a log dump.

II. A Relatively Simple Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
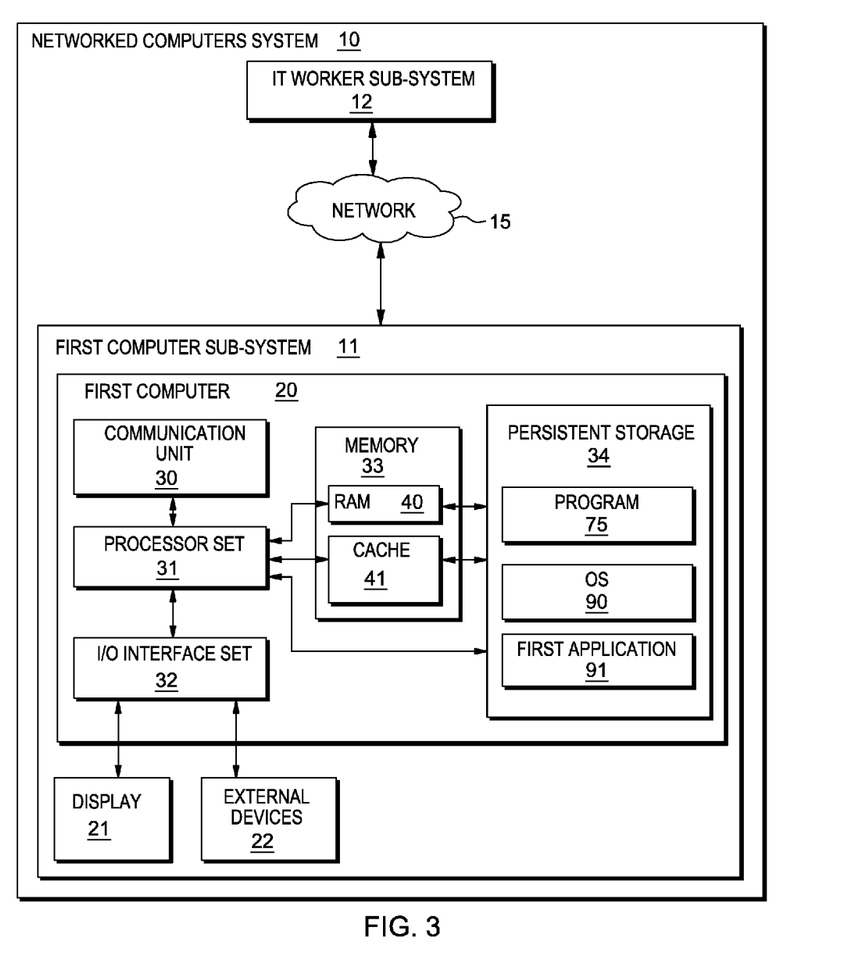
FIG. 3 is a schematic view of a second embodiment of a networked computers system according to the present disclosure.
Figure 4:
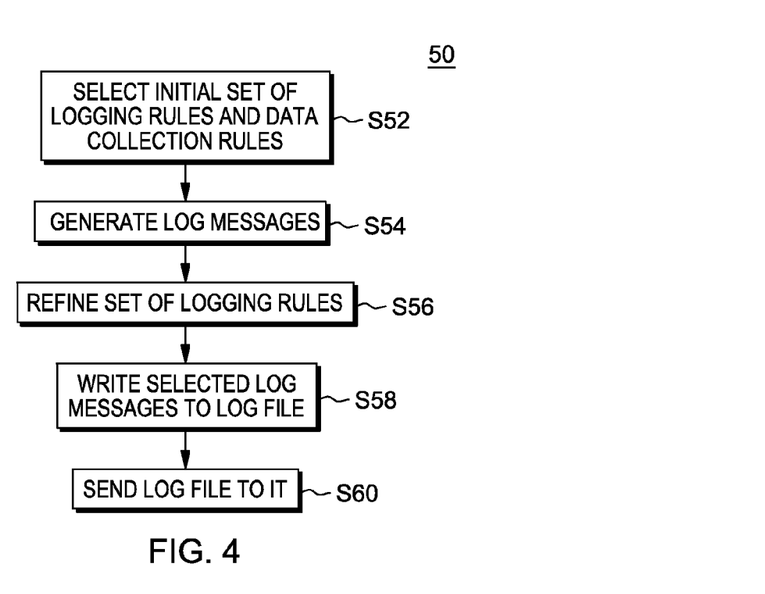
FIG. 4 is a flowchart showing a second method performed, at least in part, by the second embodiment system.
Figure 5:
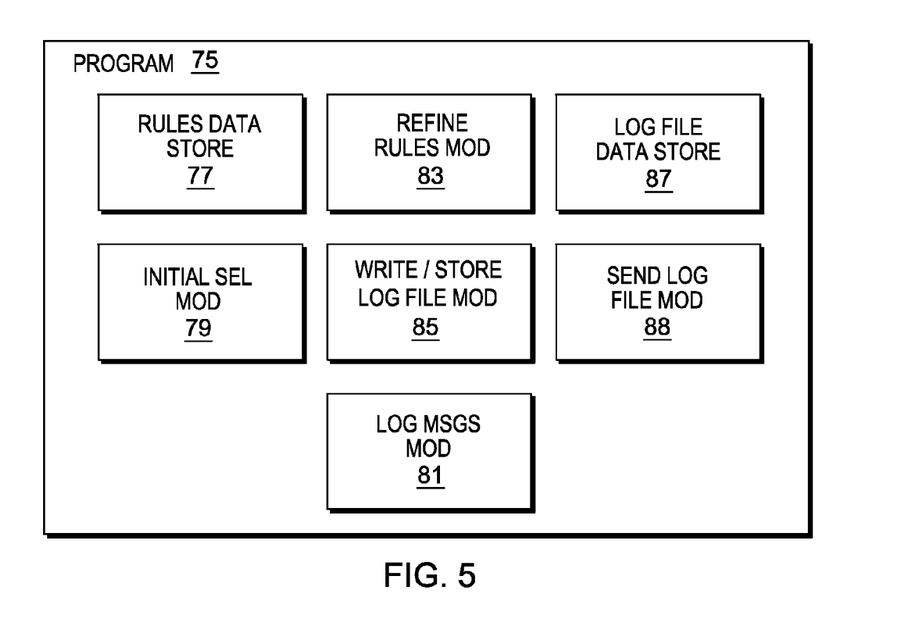
FIG. 5 is a schematic view of a portion of the second embodiment system.

FIG. 4 shows flowchart 50 which represents a method according to the present invention. FIG. 5 shows program 75 performing at least some of the method steps of flow chart 50. This method and associated software will now be discussed in this sub-section, over the course of the following paragraphs, with extensive reference to FIG. 4 (for the method step blocks) and FIG. 5 (for the software blocks). The operating environment for flowchart 50 and program 75 will be discussed later on, with extensive reference to FIG. 3, in a subsequent, dedicated sub-section of this detailed description section.

Processing begins at step S52, where rules data store 77 and initial selection module ("mod") 79 select two initial sets of rules as follows: (i) data collection rules for initially determining which operational data will be sent to a buffer memory; and (ii) logging rules for determining which operational data written into the buffer memory will be written into the more permanent (usually non-volatile) form as part of a log file.

Processing proceeds to step S54, where: (i) normal operations of first computer 11 (see FIG. 3) occur; (ii) log messages mod 81 generates log messages (not separately shown) to represent operational data (for example, operating metrics and statuses) according to the initial data collection rules set at step S52; and (iii) the logging messages are written to non-volatile buffer memory. The buffer memory is not separately shown, but it may be in and/or distributed across one, or more, of the following volatile locations shown in FIG. 3: (i) random access memory 40, cache 41 and processor set 31.

For example, as best shown by FIG. 3, during normal operation of computer 11, first application 91 is running on operating system 90. In this embodiment, the actual content of the log messages and the manner in which they are generated is basically conventional. However, it is noted that, in this embodiment, the data collection rules are set so that very, very comprehensive logging information is collected. In fact, in this embodiment, the data collection rules may even specify more comprehensive data collection than would ever be used in a conventional logging system that has no buffer.

In some embodiments, the initial logging rules will dictate that no data is written to a log file during normal operations, so that all data in the buffer will be lost when it is overwritten due to the limited size of the buffer. In other embodiments, the initial logging rules will dictate that only warnings or errors will be written from the buffer to the log file(s) during normal operations.

Processing proceeds to step S56, wherein the logging rules (initially selected at S52) are refined by refine rules mod 83. In this embodiment, step S56 occurs because a predetermined pre-condition is met, such as an error or failure or suspicious operating condition.

Processing proceeds to step S58, write/store log file mod 85 stores all logging data from the buffer to log file data store 87, which is located in program 75 in persistent storage 34 (see FIG. 3) according to the logging rules as refined at step S56. In this embodiment, only a single log file is created. Alternatively, more than one log file could be created and saved in data store 87.

Processing proceeds to step S60, where send log file mod 88 sends the log file through communication unit 30 and network 15 to information technology (IT) worker subsystem 12 for diagnostic purposes (see FIG. 3). In this embodiment, both the buffer store and the dynamic refinement of the logging rules, as discussed above, will help the IT worker get a more comprehensive and well-focused log file than would otherwise be possible or feasible.

III. Environment for the Relatively Simple Embodiment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 3 is a functional block diagram of networked computers system 10, including: first computer sub-system 11; information technology worker sub-system 12; and communication network 15. First computer sub-system 11 includes: server computer 20; display 21; and external device set 22. First computer 20 includes: communication unit 30; processor set 31; input/output (I/O) interface set 32; memory device set 33; and persistent storage device 34. Memory device set 33 includes: random access memory (RAM) device 40; and cache memory device 41. Persistent storage device 34 has stored thereon: program 75; operating system (OS) 90; and first application 91.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Policy: an imperative embodied as a rule.

Sub-set: may include an entire set from which the sub-set is selected; may, in some cases, be a null set.

What is claimed is:

1. A method for writing at least a portion of a logging file associated with a thread generated by execution of an application, the logging file including a plurality of pieces of logging information from the application's thread, the method comprising:

choosing a set of logging rules, which logging rules determine the selection of which pieces of information from an application's thread will be written to a non-volatile log file;

operating the application on a computer system to generate the application's thread;

during operation of the application and generation of the application's thread, collecting a first set of pieces of operational information relating to the operation of the application from the application's thread;

saving the first set of pieces of operational information to a volatile buffer memory, with the volatile buffer memory being dedicated to collecting logging information from the application's thread;

evaluating the first set of pieces of operational information for a pre-determined condition, wherein the pre-determined condition is based on one or more policies, and wherein the one or more policies comprise a rule, a log level, a record before time, a record after time, a logging thread rule, and a first failure data capture (FFDC) rule;

in response to a pre-determined condition occurring, selectively writing, to a non-volatile storage medium, only a first sub-set of the first set of pieces of operational information from the portion of the volatile buffer memory to the logging file, with the selection of the first sub-set from the first set being based upon the one or more policies; and in response to determining that the volatile buffer memory is full, overwriting the first set of operational information with a second set of operational information to the volatile buffer memory.

2. The method of claim 1 wherein the chosen set of logging rules mandate inclusion in the logging file of all pieces of operational information stored in the portion of the volatile buffer memory that occurred in the application's thread within a predetermined time range before and after the application's thread experiences a failure condition.

3. The method of claim 2 wherein the chosen set of logging rules further mandate inclusion in the logging file of less than all pieces of operational information stored in the portion of the volatile buffer memory that occurred in the application's thread outside of the predetermined time range.

4. The method of claim 1 wherein:
the choice of a set of logging rules is based, at least in part, upon the first set of operational information stored in the volatile buffer memory.

5. The method of claim 1 wherein the volatile buffer memory acts as a circular buffer memory so that, on an on-going basis during runtime of the application, more recent pieces of operational information collected from an application's thread will overwrite older pieces of operational information collected from the application's thread and previously saved in the volatile buffer memory.

6. The method of claim 1, wherein the pre-determined condition is selected from the group consisting of: an error and a failure.

7. A computer program product for writing at least a portion of a logging file associated with a thread generated by execution of an application, the logging file including a plurality of pieces of logging information from the application's thread, the computer program product comprising software stored on a non-transitory software storage device, the software comprising:

first program instructions programmed to choose a set of logging rules, which logging rules determine the selection of which pieces of information from an application's thread will be written to a non-volatile log file;

second program instructions programmed to operate the application on a computer system to generate the application's thread;

third program instructions programmed to, during operation of the application and generation of the application's thread by the second program instructions, collect a first set of pieces of operational information relating to the operation of the application from the application's thread;

fourth program instructions programmed to save the first set of pieces of operational information to a volatile buffer memory, with the volatile buffer memory being dedicated to collecting logging information from the application's thread;

fifth program instructions programmed to evaluate the first set of pieces of operational information for a pre-determined condition, wherein the pre-determined condition is based on one or more policies, and wherein the one or more policies comprise a rule, a log level, a record before time, a record after time, a logging thread rule, and a first failure data capture (FFDC) rule in response to a predetermined condition occurring, sixth program instructions programmed to selectively write, to a non-volatile storage medium, only a first sub-set of the first set of pieces of operational information from the portion of the volatile buffer memory the logging file, with the selection of the first sub-set from the first set being based upon the one or more policies; and in response to determining that the volatile buffer memory is full, seventh program instructions programmed to overwrite the first set of operational information with a second set of operational information to the volatile buffer memory.

8. The product of claim 7 wherein the chosen set of logging rules mandate inclusion in the logging file of all pieces of operational information stored in the portion of the volatile buffer memory that occurred in the application's thread within a predetermined time range before and after the application's thread experiences a failure condition.

9. The product of claim 8 wherein the chosen set of logging rules further mandate inclusion in the logging file of less than all pieces of operational information stored in the portion of the volatile buffer memory that occurred in the application's thread outside of the predetermined time range.

10. The product of claim 7 wherein:
the choice of a set of logging rules, by the first program instructions, is based, at least in part, upon the first set of operational information stored in the volatile buffer memory by the fourth program instructions.

11. The product of claim 7 wherein the volatile buffer memory acts as a circular buffer memory so that, on an on-going basis during runtime of the application, more recent pieces of operational information collected from an application's thread will overwrite older pieces of operational information collected from the application's thread and previously saved in the volatile buffer memory.

12. The computer program product of claim 7, wherein the pre-determined condition is selected from the group consisting of: an error and a failure.

13. A computer system for writing at least a portion of a logging file associated with a thread generated by execution of an application, the logging file including a plurality of pieces of logging information from the application's thread, the computer system comprising:

a processor(s) set; and
a non-transitory software storage device;
wherein:
the processor set is structured, located, connected and/or programmed to run software stored on the non-transitory software storage device; and
the software comprises:
first program instructions programmed to choose a set of logging rules, which logging rules determine the selection of which pieces of information from an application's thread will be written to a non-volatile log file,
second program instructions programmed to operate the application on the computer system to generate the application's thread,
third program instructions programmed to, during operation of the application and generation of the application's thread by the second program instructions, collect a first set of pieces of operational information relating to the operation of the application from the application's thread, fourth program instructions programmed to save the first set of pieces of operational information to a volatile buffer memory, with the volatile buffer memory being dedicated to collecting logging information from the application's thread;

fifth program instructions programmed to evaluate the first set of pieces of operational information for a pre-determined condition, wherein the pre-determined condition is based on one or more policies, and wherein the one or more policies comprise a rule, a log level, a record before time, a record after time, a logging thread rule, and a first failure data capture (FFDC) rule in response to a predetermined condition occurring, sixth program instructions programmed to selectively write, to a non-volatile storage medium, only a first sub-set of the first set of pieces of operational information from the portion of the volatile buffer memory the logging file, with the selection of the first sub-set from the first set being based upon the one or more policies; and in response to determining that the volatile buffer memory is full, seventh program instructions programmed to overwrite the first set of operational information with a second set of operational information to the volatile buffer memory.

14. The system of claim 13 wherein the chosen set of logging rules mandate inclusion in the logging file of all pieces of operational information stored in the portion of the volatile buffer memory that occurred in the application's thread within a predetermined time range before and after the application's thread experiences a failure condition.

15. The system of claim 14 wherein the chosen set of logging rules further mandate inclusion in the logging file of less than all pieces of operational information stored in the portion of the volatile buffer memory that occurred in the application's thread outside of the predetermined time range.

16. The system of claim 13 wherein:
the choice of a set of logging rules, by the first program instructions, is based, at least in part, upon the first set of operational information stored in the volatile buffer memory by the fourth program instructions.

17. The system of claim 13 wherein the volatile buffer memory acts as a circular buffer memory so that, on an on-going basis during runtime of the application, more recent pieces of operational information collected from an application's thread will overwrite older pieces of operational information collected from the application's thread and previously saved in the volatile buffer memory.

18. The computer system of claim 13, wherein the pre-determined condition is selected from the group consisting of: an error and a failure.

* * * * *